March 30, 1937.  R. D. EVANS  2,075,105
REGULATING SYSTEM
Filed April 10, 1935

WITNESSES:
C. J. Weller.
C. F. Bryant

INVENTOR
Robert D. Evans.
BY Ezra W. Savage
ATTORNEY

Patented Mar. 30, 1937

2,075,105

UNITED STATES PATENT OFFICE 2,075,105

REGULATING SYSTEM

Robert D. Evans, Swissvale, Pa., assignor to Westinghouse Electric & Manufacturing Company, East Pittsburgh, Pa., a corporation of Pennsylvania Application April 10, 1935, Serial No. 15,592

4 Claims. (Cl. 171—119)

My invention relates to electrical control systems and it has particular relation to systems which effect voltage control by automatically modifying the excitation of a dynamo-electric machine in accordance with changes in machine loading.

One object of my invention is to provide a simplified form of such voltage-control equipment which is especially suitable for application to alternating-current machines with which self-excitation supply circuits are utilized.

Another object is to raise the speed of corrective response to load change of which systems of this class are capable.

A further object is to provide a system of the type described which with advantage may be used to supplement conventional forms of machine-voltage regulating equipment.

In practicing my invention I connect in the circuit through which the machine exciting current is supplied a reactor or other form of impedance element through which I circulate a current determined by the machine loading. The voltage thus caused to appear across the reactor combines with the main energizing voltage, derived from the machine terminals, in such manner as to raise the exciting current when the load increases and to lower it when the load falls. By properly proportioning the reactor with respect to the other parts of the excitation-supply circuit the machine may be given a relatively flat or even a rising voltage with load characteristic.

Application of the system of my invention to many situations completely eliminates the need for the conventional form of voltage-change sensitive regulating equipment. Where, however, unusually high accuracy of voltage control is needed my invention may with advantage also be applied to supplement such a conventional voltage regulator. It is, in this and in other situations, especially effective in meeting the quick-response requirements which are peculiar to alternating-current systems involving interconnected synchronous machines.

My invention itself, together with additional objects and advantages thereof will best be understood from the following description of specific embodiments when taken in conjunction with the accompanying drawing in which.

Figure 1:
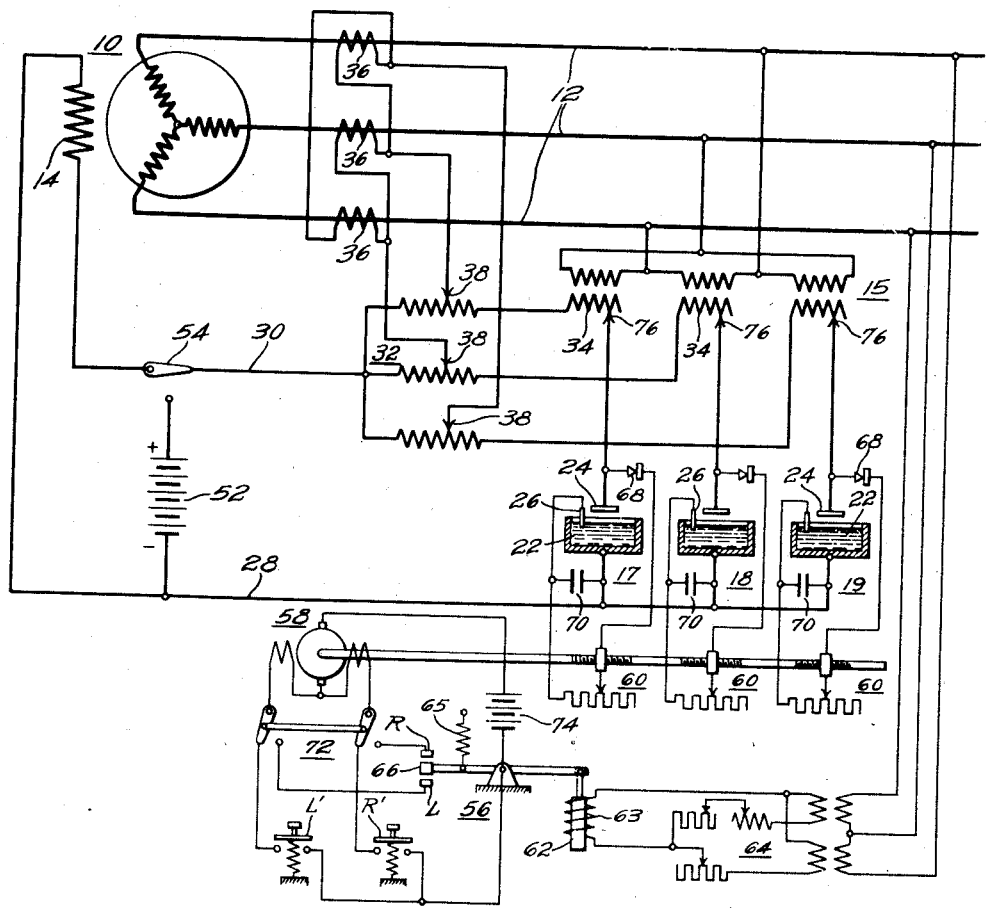
Figure 1 is a diagrammatic view of apparatus and circuits illustrating the load-responsive excitation-adjusting system of my invention applied to a self-excited alternating-current dynamo-electric machine.

Referring to the drawing and particularly to Fig. 1 thereof, the excitation supply system with which my invention is there shown is illustrated in association with a dynamo-electric machine 10 which comprises armature windings, directly connected with the conductors 12 of an alternating-current circuit, and an exciting field winding 14. While this machine is shown as being of the three-phase synchronous type, it will be apparent that the load-responsive excitation adjusting means of my invention about to be described are likewise applicable to alternating-current machines of other character and having a different number of phases.

The field winding 14 is supplied with energizing current from circuit conductors 12 through a bank of delta-star connected transformers 15 in the output circuits of which rectifying devices 17, 18 and 19 are connected in the manner shown. These rectifiers may be any one of a number of conventional types either non-controllable in their effective conductivity or of the illustrated controllable type. As depicted, each comprises a cathode element 22, preferably in the form of a pool of mercury or other vaporizable reconstructing material, and an anode 24 positioned thereabove. A make-alive element 26 of silicon carbide crystal or other poorly conductive material of suitable characteristics is positioned in contact with the cathode for the purpose of initiating conduction through the rectifier in a manner to be further explained.

In the connection shown in Fig. 1 the rectifier cathodes 22 are all connected to a common bus 28 to which one end of the machine field winding 14 is joined. The rectifier anodes 24 are respectively joined with the star-connected secondary windings 34 in transformer bank 15, and the neutral point of this star connection is joined, by means of a conductor 30, to the other end of the field winding 14.

Assuming that the effective-conductivity characteristics of the rectifiers 17, 18 and 19, each of which is capable of passing current only in the direction from the anode to the cathode, are maintained fixed at a given value, the excitation supply circuit thus far explained will function to circulate through the machine field winding 14 a three-phase rectified current having the required unidirectional characteristics and which in value is directly proportional to the voltage appearing in the generator output circuit 12.

As the machine 10 is loaded, therefore, the tendency is, due to the increasing magnitude of internal voltage drop, for the terminal voltage to decrease. The effect of this decrease is cumulative and it thus results in progressively lessening intensities of machine excitation. Consequently, an alternating current machine which is provided with the described self-excitation circuit merely has a voltage characteristic which is so drooping as to render machine operation generally unsatisfactory.

In accordance with my invention I provide additional corrective or compensating means in a highly improved and simplified form. This apparatus comprises a set of reactors 32 connected, in the manner shown in Fig. 1, intermediate the secondary windings 34 of the machine voltage energized transformers 15 and the field-winding-joined conductor 30 which constitutes the common point of the star connection of the transformer secondaries. Through these reactors there are circulated, preferably by means of a corresponding group of series transformers 36 connected in the manner shown in the output circuit 12 of machine 10, currents which are directly proportional to the machine loading. The phase relations of these currents are such with respect to the voltages supplied by the transformers 15 that the resulting voltage drops across the reactors 32 additively combine with the secondary winding voltages and thereby strengthen, in direct proportion to the machine loading, the current supplied to the machine field winding 14. This strengthening may be so adjusted in magnitude that the before explained inherent drooping voltage with machine load characteristic is not only minimized or entirely eliminated, but it may also be converted into a rising one.

Figure 2:
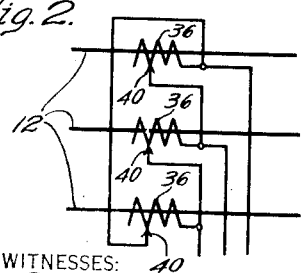
Fig. 2 is a partial reproduction of the diagram of Fig. 1 showing the load-circuit current transformers thereof provided with tapped windings.
Figure 3:
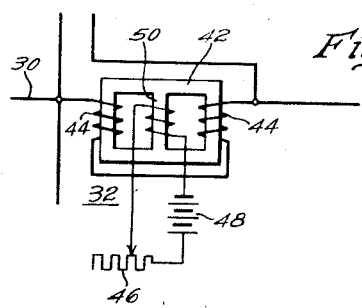
Fig. 3 is a similar partial reproduction of the system of Fig. 1 showing how saturable-controlled reactor devices may be utilized in accordance with my invention in the excitation-supply circuit of the regulated machine.

Among the various manners in which the mentioned adjustment may be effected is that indicated in Fig. 1 in which the windings of the reactors 32 are provided with adjustable tap connections 38 by means of which the portion of the windings through which the compensating current is circulated may be varied. Another method, indicated in Fig. 2, utilizes tap connections 40 in association with the windings of the series transformers 36. A third method, indicated in Fig. 3, utilizes a well known form of saturable core reactor for each of the devices 32 of Fig. 1. Carried by the two outer legs of the magnetic core structure 42 are windings 44 through which the machine field winding current flows and also through which the load-proportional compensating current is circulated. By varying, as by means of a rheostat 46, the current which a suitable source of unidirectional voltage 48 circulates through a saturating winding 50 carried on the middle leg of the core structure, the effective reactance of the windings 44 may be varied to produce the desired adjustment.

In order that the voltage of machine 10, which may be a generator, synchronous condenser or other comparable dynamo-electric device, may properly build up during the starting period an auxiliary source of excitation, shown as a battery 52 may, if required, be utilized. In such case a supply source selector switch 54 would be moved to the downwardly closed position at the beginning of the starting operation and returned to the illustrated upwardly closed position after the machine voltage attained a substantial value.

The described automatic load-responsive excitation-adjusting system of my invention possesses a number of advantages among which may be mentioned simplicity, reliability and an exceedingly high speed of response particularly to exceedingly large and sudden load changes which abnormally modify the machine magnetization. It is therefore especially effective in meeting the quick-response requirements of stability which are peculiar to alternating current systems involving interconnected synchronous machines of which the illustrated machine 10 may be assumed to be one. There is substantially no time lag to the building up of the voltage drops across the reactors 32 and transferring these into appropriate increases in the effective current supplied to the machine field winding 14.

It may here be pointed out that the described system does not, in the usual instance, produce an absolutely flat regulation curve even though it is capable of providing a very close approach thereto. This is because of the saturation effects of the magnetic circuit of the controlled machine.

In certain situations where more than ordinary accuracy of machine voltage control is required, it may be desirable to supplement the equipment of my invention, which as already indicated replaces in the usual case the conventional form of voltage regulator, by a voltage-sensitive type of excitation adjusting apparatus. Such apparatus is also illustrated in Fig. 1 as comprising a contact-making device 56, sensitive to changes in the voltage of circuit 12, which controls the operation of a reversible motor 58 which is adapted to adjust a group of conductivity-controlling rheostats 60 associated with the rectifiers 17, 18 and 19.

In a rectifier of the type depicted at 17, 18 and 19, current conduction can take place only when the make-alive element 26 is made active to liberate ions and electrons from the cathode material 22. Each of these rectifiers will thus act as an insulator during both the positive and negative half cycles of its anode voltage unless an exciting current is supplied to its make-alive element. Passage of current through the element, however, effects the liberation needed to strike an arc which continuously sustains current flow between the major rectifier element until, in the polyphase combination shown, the device in the next phase in sequence becomes conducting.

To initiate the named arc during each positive half cycle of anode voltage, the make-alive element exciting potential is supplied from the major element circuit of each rectifier through a circuit which includes a small auxiliary rectifier, indicated in Fig. 1 at 68. And to adjust the point at which conduction starts during each of these half cycles to thereby control the conductivity of the rectifiers, the character of this exciting potential may be varied.

The described potential character variation is effected in the system shown by means of rheostats 60 which in association with capacitors 70 are so connected in the make-alive potential supply circuits as to adjustably delay each make-alive element potential with respect to that which acts upon the rectifier anode. When the delay is small the arc starting point is early and maximum rectifier conductivity results. A large delay correspondingly reduces the effective current passed by the rectifier.

The actuating winding 63 of the device 56 which controls the conductivity-adjusting rheostats 60, is energized through a positive-phase-sequence net-work connection 64, by the voltages acting in circuit 12. This network functions to supply to the winding a single phase voltage which at all times is proportional to the positive phase sequence component of the three single phase voltages acting in the generator output circuit 12. An upwardly acting force directly proportional to the voltage of this circuit is thus exerted, in opposition to a tension spring 65, upon an armature 62 which controls the position of a movable contact member 66.

In operation of the depicted voltage regulating system, it will first be assumed that a control-transfer switch 72 is closed to the right hand position. When the voltage of machine 10 falls below a desired value, device 56 biases contact member 66 into engagement with a stationary member R and thereby completes a circuit whereby motor 58 is so energized, from a suitable power source shown in the form of a battery 74, that it adjusts rheostats 60 in the rectifier-conductivity increasing direction. The resulting rise in the conductivity of rectifiers 17, 18 and 19 increases the current supplied to machine field winding 14 and thereby correctively adjusts the machine voltage back to the desired value.

In a similar manner in the event that the machine voltage rises above the desired value device 56 biases contact member 66 downwardly into engagement with a stationary member L thereby completing a circuit which operates motor 58 in the rectifier-conductivity decreasing direction. This produces the decrease in the machine excitation required to correctively lower the machine voltage back to its desired value.

One characteristic common to all rheostatic types of voltage regulators, of which the one just described is representative, is that an appreciable time must elapse before changes in the voltage of the regulated circuit can effect the appropriate corrective changes in machine excitation. Consequently while the equipment just described is adequate and satisfactory for correcting voltage fluctuations which are relatively slow or gradual, it may not be adequate when the changes proceed with unusual rapidity. Therefore a supplement by the load-change responsive excitation-adjusting means of my invention which have highly rapid response characteristics is in many instances advisable, particularly in connection with alternating current systems involving interconnected synchronous machines where stability maintenance is an important consideration. The two systems, responsive respectively to two different characteristics of the regulated machine, mutually assist each other in maintaining the output voltage thereof at the desired steady value.

The adjustable conductivity feature of the rectifiers 17, 18 and 19 is also of use in instances in which no voltage-sensitive regulating equipment is utilized. When, for example, the control selector switch 72 of Fig. 1 is biased to the illustrated left hand position, the motor 58 may be controlled by the manually adjustable push button devices L' and R' to adjust the conductivity-determining rheostats 60 at the point most advantageous for operation of the machine excitation supply circuit. Such an adjustment is the equivalent of changing the position of taps 74 associated with secondary windings 34 of the transformer bank 15. It also performs the same function as would a manually adjustable rheostat inserted directly in the energizing circuit of the machine field winding 14.

It will be understood that if desired the voltage-sensitive regulating equipment just described may with equal effectiveness be arranged to operate on the reactor devices 32 instead of on the rectifiers as shown.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. In a system comprising an alternating-current machine and an excitation-supply circuit therefor energized by the voltage of the machine, said circuit including a rectifier, the combination of a reactor serially connected in said circuit, means for circulating through said reactor a current determined by the machine loading, and means sensitive to changes in the machine voltage for so adjusting the machine exciting current as to always restore said voltage to substantially the same given value.

2. In a system comprising an alternating-current machine, an excitation-supply circuit therefor energized by the voltage of the machine, and a controllable rectifier included in said circuit, the combination of a reactor serially connected in said circuit, means for circulating through said reactor a current determined by the machine loading, and means sensitive to changes in the machine voltage for so adjusting the machine exciting current as to always restore said voltage to substantially the same given value.

3. In a system comprising an alternating-current machine having field and armature windings, a power circuit connected with said armature winding, a rectifier, and a circuit including said rectifier for supplying to said field winding an energizing current determined by the voltage of said power circuit, the combination of a reactor serially connected in said field winding supply circuit, and a current transformer connected intermediate the power circuit and the machine armature winding and adapted to so circulate its output current through said reactor as to produce thereacross a voltage which aids that of the power circuit in supplying current to said field winding.

4. In combination with a synchronous machine having a field winding and polyphase armature windings, a power circuit connected with said armature windings, a polyphase rectifier, a circuit including said rectifier for supplying to said field winding an energizing current determined by the power-circuit voltage, a reactor serially connected in each of said circuit phases, and a current transformer connected intermediate each phase of the power circuit and the machine armature winding and adapted to so circulate its output current through said reactor as to produce thereacross a voltage which aids that of the power circuit in supplying current to said field winding.

ROBERT D. EVANS.